US012054368B2

(12) United States Patent
D'Eufemia

(10) Patent No.: US 12,054,368 B2
(45) Date of Patent: Aug. 6, 2024

(54) SYSTEM FOR TRANSFERRING AN OBJECT FROM A SHIP TO AN OFFSHORE STRUCTURE

(71) Applicant: Ørsted Wind Power A/S, Fredericia (DK)

(72) Inventor: Beatrice D'Eufemia, Gentofte (DK)

(73) Assignee: Ørsted Wind Power A/S (DK)

(*) Notice: Subject to any disclaimer, the term of this patent is extended or adjusted under 35 U.S.C. 154(b) by 653 days.

(21) Appl. No.: 17/293,692

(22) PCT Filed: Oct. 24, 2019

(86) PCT No.: PCT/EP2019/079060
§ 371 (c)(1),
(2) Date: May 13, 2021

(87) PCT Pub. No.: WO2020/104137
PCT Pub. Date: May 28, 2020

(65) Prior Publication Data

US 2022/0002121 A1 Jan. 6, 2022

(30) Foreign Application Priority Data

Nov. 19, 2018 (EP) .................................... 18207102

(51) Int. Cl.
*B66D 1/52* (2006.01)
*B63B 27/16* (2006.01)
(Continued)

(52) U.S. Cl.
CPC .............. *B66D 1/525* (2013.01); *B63B 27/16* (2013.01); *B63B 27/18* (2013.01); *B66C 13/02* (2013.01);
(Continued)

(58) Field of Classification Search
CPC . B66D 2700/0108; B66C 13/02; B66C 13/46; B66C 13/04; B66C 23/52
See application file for complete search history.

(56) References Cited

U.S. PATENT DOCUMENTS 5,089,972 A * 2/1992 Nachman ................ B66C 13/48 700/218
2012/0257973 A1* 10/2012 Rebsdorf ................ F03D 13/25 416/146 R
(Continued)

FOREIGN PATENT DOCUMENTS

CN 104136359 B 11/2014
CN 106495027 A 3/2017
(Continued)

*Primary Examiner* — Timothy R Waggoner
(74) *Attorney, Agent, or Firm* — Condo Roccia Koptiw LLP

(57) ABSTRACT

Described herein are systems, methods, and structures for transferring an object between a ship and an offshore structure, comprising a hoisting mechanism arranged on the offshore structure and adapted to attach to the object, at least one range sensing device adapted to provide data relating to a detected distance from a reference point on the offshore structure to the ship, where the system is adapted to receive the data from the at least one range sensing device and to move the hoisting cable in response to the detected distance, and a motion reference unit adapted to provide data relating to a detected motion of the ship independently of the at least one range sensing device, and wherein the system is adapted to move the hoisting cable in response to the detected motion of the ship.

19 Claims, 2 Drawing Sheets

(51) Int. Cl.
*B63B 27/18* (2006.01)
*B66C 13/02* (2006.01)

(52) U.S. Cl.
CPC .................. *B66C 2700/085* (2013.01); *B66D 2700/0108* (2013.01)

(56) References Cited

U.S. PATENT DOCUMENTS

| | | | | |
|---|---|---|---|---|
| 2012/0296519 | A1 | 11/2012 | Eberharter et al. | |
| 2014/0107971 | A1* | 4/2014 | Engedal | B66D 1/52 702/150 |
| 2014/0166156 | A1* | 6/2014 | Dicke-Kuenitz | B67D 9/02 141/263 |
| 2015/0112638 | A1 | 4/2015 | Morrow et al. | |
| 2017/0096196 | A1 | 4/2017 | Foo et al. | |

FOREIGN PATENT DOCUMENTS

| | | | |
|---|---|---|---|
| IN | 06846DN2014 | | 5/2015 |
| JP | 2012-031860 | | 2/2012 |
| WO | WO 2014083873 | A1 | 6/2014 |
| WO | WO 2014128459 | A1 | 8/2014 |
| WO | WO 2015/044898 | | 4/2015 |

* cited by examiner

SYSTEM FOR TRANSFERRING AN OBJECT FROM A SHIP TO AN OFFSHORE STRUCTURE

CROSS REFERENCE TO RELATED APPLICATIONS

This application is the National Stage Entry under 35 U.S.C. § 371 of Patent Cooperation Treaty Application No. PCT/EP2019/079060, filed 24 Oct. 2019, which claims priority from European Application No. 18207102.7, filed 19 Nov. 2018, the contents of each of which are hereby incorporated by reference herein in their entireties.

TECHNICAL FIELD

The present invention relates to a system for transferring an object or person from a ship to an offshore structure in particular but not exclusively offshore wind turbines.

BACKGROUND

The present invention takes its outset in the operation and service offshore wind farms but is applicable on a wide range of other offshore operations. Such operations may necessitate service crew to be sailed to an offshore location by a ship, commonly referred to as the crew transfer vessel. At the offshore location, the persons who are part of or form the service crew need to be transferred from the ship to a structure to perform the service. Also, equipment or cargo may need to be transferred. The structure is typically a fixed structure such as a wind turbine or a platform on a fixed foundation, but could also be a floating structure, anchored or not. Likewise, the persons will need to transfer back to a ship from the structure.

Because of the sea waves, be it local wind driven waves or sea swells coming from far away, the ship will be in motion and typically move with respect to the structure to or from which the transfer is to take place. Such relative motion poses a risk to the safe transfer of persons.

A normal countermeasure is to push the bow of the crew transfer vessel against a protective landing structure mounted on the offshore structure using the ship's propulsion and manoeuvring system to create friction between the bow and the landing structure. For offshore structures, such as wind turbines located on monopiles the landing structure typically comprises a pair of vertical protective columns arranged with a suitable spacing to the monopile, thereby inter alia protecting the monopile from scratching or denting by the ship, the latter potentially compromising the structural integrity of the monopile. A ladder for climbing the offshore structure is arranged between the columns closer to the structure, so that the protective landing structure is also protective in the sense the columns protect a person from getting hit by the bow of the ship.

To cushion and increase friction the bow is typically fitted with a rubber cushion. If the sea waves are not too big, this will keep the bow in permanent engagement with the protective landing structure in the sense that there is no relative motion, which could endanger the safe transfer. If, however, the sea waves become too big, there is a risk of sudden slip of the engagement between the bow and the structure and a sudden rapid motion of the ship's bow along the structure be it upwardly or downwardly in a vertical direction, to the side or away from the structure. If this happens at the critical moment where the person is about to grab hold of and step onto the rungs of the ladder it could leave the person hanging in the safety line in the middle of the transfer. Even though the person will be protected by the columns of the protective landing structure, and may still be able to grab the ladder and start the climb, this is by no means a desirable situation.

Even if things go according to plan, the climb itself is also a somewhat difficult task, given that the person is wearing a survival suit and possibly other gear that may restrict their motions and add to the weight. It has therefore been suggested to use a hoisting mechanism to assist the climb. One such example is found in WO2014/128459 incorporated herein by reference.

In addition to the assisted climb WO2014/128459 furthermore suggests using the hoisting mechanism not only to support the climb but also to use it to lift a transfer carrier from the ship to a platform on the structure.

Though quite different from each other the two embodiments, assisted climbing and carrier lifting, respectively, of WO2014/128459 both suggest the use of an unspecified measuring device associated with the structure—and not the ship, to keep track of the ship's motion, and control the hoisting mechanism accordingly, so as to keep the hoisting cable taut when the person is standing on the deck of the ship in a survival suit and attached to the hoisting cable via a harness, or when the transfer carrier is in a dock or clamping mechanism on the ship. Also, when lowering the transfer carrier to the deck the motion of the transfer carrier can be matched with the motions of the ship. In practice, the unspecified measuring device has been implemented as one or two laser range finders mounted on the structure looking downward along the landing structure towards the deck of the docked ship.

The suggested solutions of WO2014/128459, however, present some disadvantages if they are to be implemented on an offshore structure without the protective landing structure in particular no ladder, both of which significantly contribute to the costs of erecting and maintaining the offshore structure. Removing the ladder will reduce the complexity of the structure and naturally also reduce the steel consumption of the structure.

One disadvantage is the need for a specialized transfer carrier, in turn, necessitating special facilities such as a dock or clamping means to maintain it secured on the deck of the ship during loading or entry or unloading or exit respectively of equipment or personnel. A second is the lack of protection of personnel if during the transfer from the ship to the offshore structure the ship suddenly slips. If the ship suddenly slips the persons will suddenly find themselves suspended in mid-air, risking being hit by the ship, if they are not immediately hoisted upward out of harm's way. Unlike the traditional transfer in harness, the person will neither be protected by the landing structure nor able to get out of the way on his own.

Descending, poses additional problems. As long as the ship is present below the laser range finders, the motion of the person may well be matched to those of the ship. However, if the ship slips horizontally out of the view of the laser range finders, the transfer will have to be suspended or aborted. That is to say, the person must be hoisted sufficiently far away upward from the ship to ensure that he cannot be hit by the ship when the ship docks anew, even on a tall wave. The descent can only be resumed once the laser range finders gain contact with the ship again. If the ship for some reason cannot dock again the descent has to be aborted entirely, as the person cannot hang suspended in the harness indefinitely. Instead the descent has to be aborted and the person hoisted back onto the structure.

This, in turn, poses a further problem of establishing a failsafe hoisting mechanism, so that e.g. in the event of power failure, the person can still be hoisted back onto the structure.

SUMMARY

Based on this background it is the object of the present invention to provide a system for transferring an object from a ship to an offshore structure without the use of a ladder, and which does not suffer from the above drawbacks and at the same time allows transfer at a structure without a protective landing structure.

According to a first aspect of the invention this object is achieved by a system for transferring an object from a ship to an offshore structure, said system comprising an electrically operated hoisting mechanism arranged on said offshore structure and adapted to move a hoisting cable, where the hoisting cable is attached to said hoisting mechanism, and said hoisting cable comprises an attachment means adapted for attachment to said object, said system further comprising at least one range sensing device adapted to provide data relating to a detected distance from a reference point on said offshore structure to said ship, where said system is adapted to receive said data from said at least one range sensing device and to move said hoisting cable in response to said detected distance, wherein said system further comprises a motion reference unit (MRU) adapted to provide data relating to a detected motion of said ship independently of said at least one range sensing device, and wherein said system is adapted to move said hoisting cable in response to said detected motion of the ship.

By the introduction of a motion reference unit the hoisting mechanism on the offshore structure becomes a part of a larger system including the ship. Having the ship as an integrated part of the system and incorporating motion reference data therefrom allows the controller of the hoisting mechanism to incorporate data on the motion of the ship even if it is not within view of the range sensing device. This, in turn, allows the controller of the hoisting mechanism to continue the control of the hoisting motion up and down in synchronicity with the ship, without the need of the range sensing device. Thus, it will no longer be necessary to hoist the person far away to a safe distance, and wait until the ship has docked again before resuming the descend procedure. Instead a much shorter safety distance can be upheld, while the ship is docking again, and the descent be resumed with a much shorter initial distance.

According to a first preferred embodiment of the first aspect of the invention, the motion reference unit comprises at least one motion reference unit on said ship. Motion reference units are readily available and will provide sufficient precision, at least for the duration of the docking procedure.

However, according to a further preferred embodiment of the first aspect of the invention, the motion reference unit may additionally or alternatively comprise a receiver for external positioning data. A motion reference unit using an external motion reference may be more reliable over longer time spans than motion reference units relying on accelerometers or gyroscopes alone.

According to another preferred embodiment of the first aspect of the invention, the system further comprises an emergency power supply for said electrically operated hoisting mechanism. This will allow the person to be hoisted onto the platform or lowered to the ship as the case may be, even if the normal power supply fails.

According to a further preferred embodiment of the first aspect of the invention, the emergency power supply comprises an uninterruptable power supply. This will, at least within a certain time frame, allow the person to be hoisted onto the platform or lowered to the ship as the case may be, even if the normal power supply fails or as a last measure be hoisted back onto the platform, if docking of the ship turns out to be impossible within the given time frame.

According to yet a further preferred embodiment of the first aspect of the invention, the offshore structure further comprises an electrical power supply cable attachable to an external power source. This will provide two major advantages. The first is that it will be able to provide a power supply of longer duration from generators on board the ship, e.g. so as to substitute the emergency power supply if installed. The second is that it will be possible to transfer personnel to a completely powerless structure. This could be a wind turbine where the connection to external supply has been severed, and the wind turbine thus neither being able to provide any power itself nor being able to receive any via the normal connection. In that case power for the hoisting mechanism can then be supplied from the ship.

According to yet a further preferred embodiment of the first aspect of the invention, the external power source is a generator on the ship, in particular a generator which is independent of the electrical system of the ship. This allows the power to be supplied directly at the system voltages used on the offshore structure without conversion from any system voltages that may be used on the ship.

According to another preferred embodiment of the first aspect of the invention, the hoisting mechanism comprises a crane arm. Using a crane arm, allows the person to be transferred to be kept in safe distance from the structure during the hoisting process.

According to a second aspect of the invention, the object is achieved by a method for transferring an object from a ship to an offshore structure, wherein a system according to the first aspect of the invention is used.

BRIEF DESCRIPTION OF THE DRAWINGS

The present invention will now be described in greater detail based on non-limiting exemplary embodiments and the appended drawings, on which.

DETAILED DESCRIPTION

Figure 1:
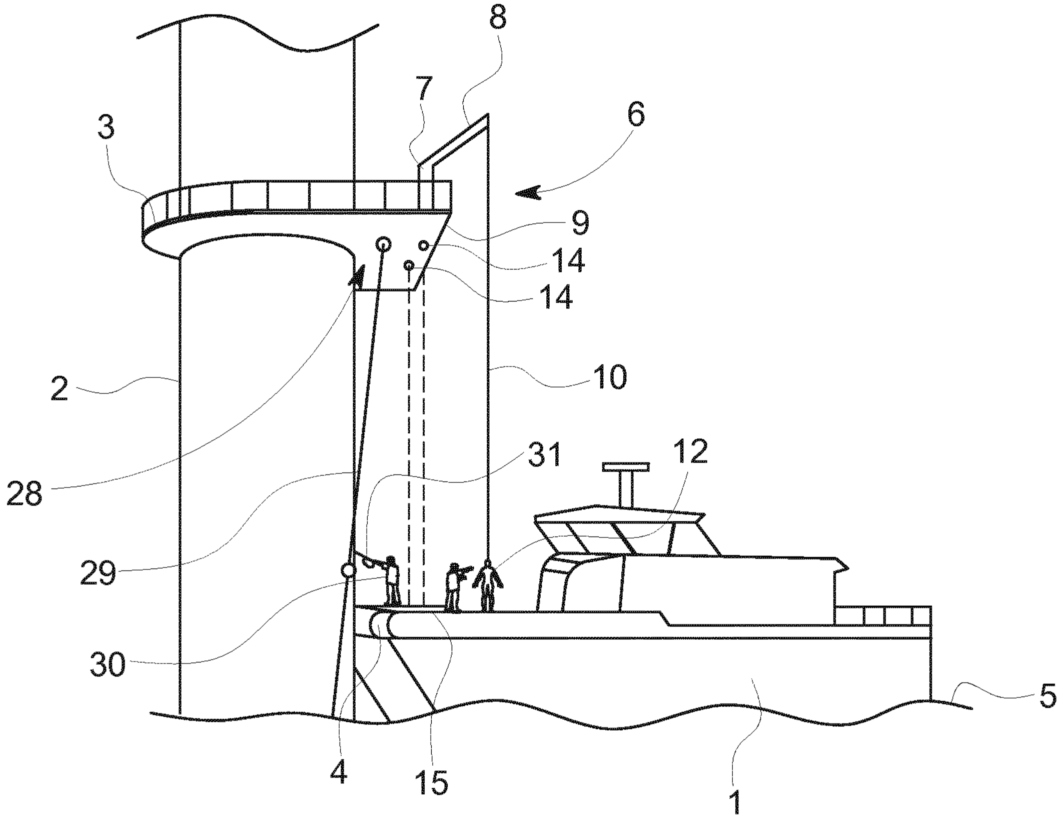
FIG. 1 shows schematic drawing of a system according to the invention comprising a ship docked at a ladderless offshore structure.
Figure 2:
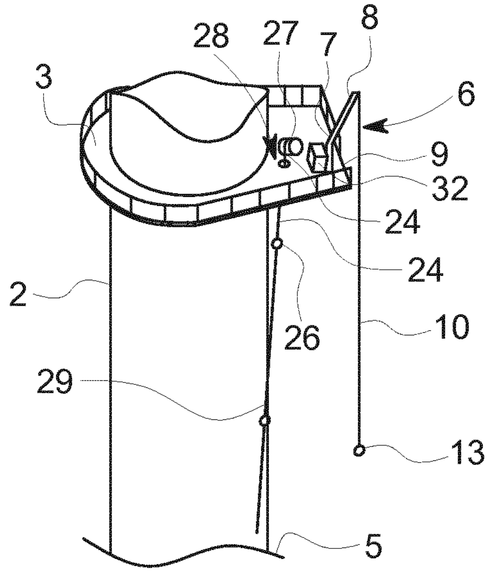
FIG. 2 shows details of the ladderless offshore structure of FIG. 1.
Figure 3:
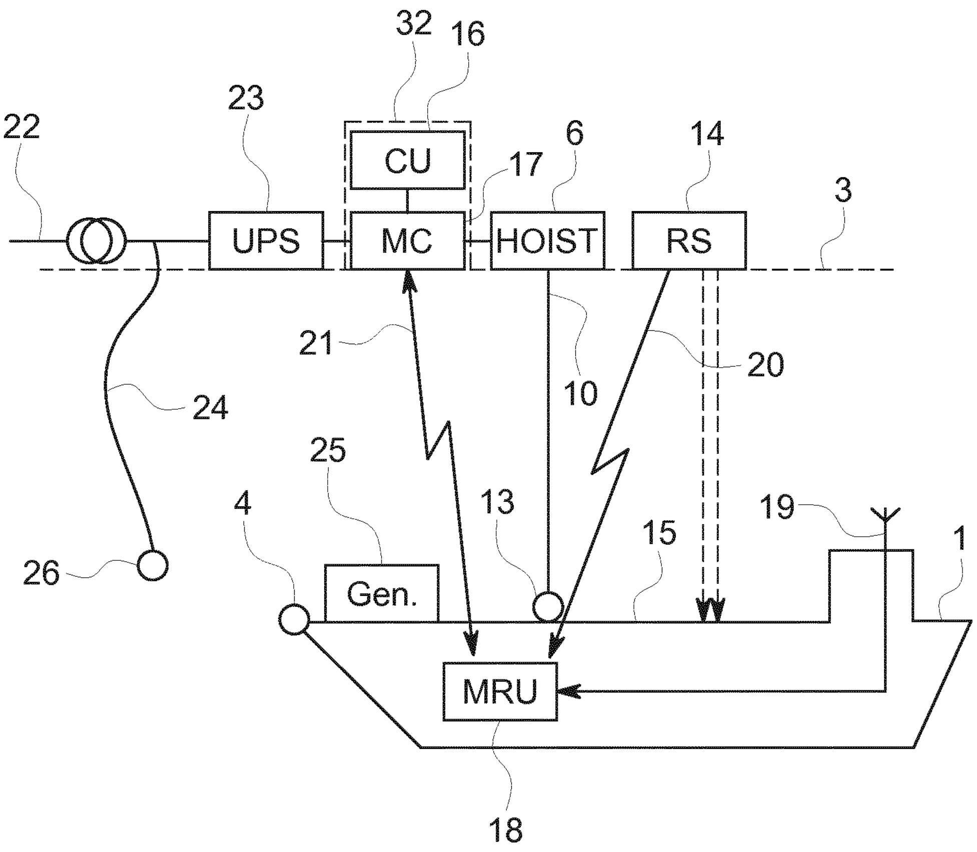
FIG. 3 is a schematic diagram of the interacting parts of the system.

Turning first to FIG. 1 a ship 1, such as a crew transfer vessel, is shown docked at an offshore structure 2, such as a monopile foundation of a wind turbine generator. Docked in this context means that the bow of ship 1 is pressed against the offshore structure 2, under the engine power of the ship 1. For this the bow comprises a fender 4 comprising materials with elastic and frictional properties suitable for keeping the bow in engagement with the offshore structure 2 under normal circumstances without damaging the offshore structure 2. Though the remainder of the ship may still move, the bow is relatively steady. There is, however, always a risk of the bow slipping if wind, waves or current become too excessive.

In this docked position transfers of objects, in particular persons, may take place. As will be seen the offshore structure 2 of the system is without the conventional protective landing structure and ladder. Persons and other objects to be transferred therefore must be hoisted onto the offshore structure 2, i.e. onto a platform 3 arranged quite a distance above the sea surface 5.

For this a hoisting mechanism 6 such as a crane 7 with an arm 8 extending over the edge 9 of the platform 3 is provided. The hoisting mechanism 6 further comprises a hoisting cable 10 with an attachment means 13 at the end for the person 12 to be hooked onto. Hoisting cable 10 is to be understood in a broad sense and could include wires of steel, as well as cables, ropes, cords, ribbons or similar long flexible members of natural or polymer fibres suitable for the hoisting purpose. The attachment means 13 could comprise a ring or a loop that the person 12 to be transferred may attach to or vice versa.

For the safe transfer of the person 12 the offshore structure comprises at least one range sensing device 14 (only shown on FIG. 1), e.g. comprising laser range sensors, located at a suitable reference point on the offshore structure 2, e.g. on the lower side of the platform 3, allowing them to measure the distance to the deck of the ship 1, when docked at the offshore structure 2. The measured distance, or rather data relating to the detected distance, from the reference point on said offshore structure 2 to the ship 1, e.g. the deck 15 thereof, is communicated in real time to a control device 16 on the offshore structure 2 via a wireless connection 20. Here it is received and processed, to provide an input to the control mechanism 17, e.g. a motor controller for controlling an electric motor of the hoisting mechanism 6 on the offshore structure 2. The input to the motor controller is also sent via a wireless connection 21, which may or may not be the same as the wireless connection 20 used for the data relating to the detected distance. One or more of the devices, such as the control device 16 and the control mechanism 17, may be integrated as one single unit 32.

Receiving the input in real time, allows the hoisting mechanism 6 to lift and lower the hoisting cable 10, and thereby anything attached thereto in synchronicity with the up and downward motions of the ship 1, in particular the deck 15 of the ship 1, or a selected part of the deck 15 of the ship 1. This synchronicity aids in securing safe transfer, not only from the ship 1 to the platform 3, but in particular from the platform 3 to the ship 1, as risk is reduced that the ship 1 may slip away below the person 12 before he is lifted off the deck, as well as for the person 12 to be hit by a ship 1 coming up while the person 12 is being lowered.

However, the ship 1 may not only slip vertically but potentially also sideways or even backwards. In those cases, the range sensing device 14 loses track of the deck 15 of the ship 1. Not knowing the position of the deck 15 in turn necessitates that the person 12 be hoisted sufficiently far away from the deck 15 of the ship 1 to ensure that he cannot be hit by the ship 1 or trapped between the ship 1 and the structure 2.

The present invention, however, reduces the risk that the person 12 is not being hoisted away from the deck 15 of the ship 1 by automating the procedure. More specifically the present invention utilizes a motion reference unit 18 adapted to provide data relating to a detected motion of said ship 1 independently of said at least one range sensing device 14. Thus, even if the ship 1 moves out of the view of the at least one range sensing device 14, the control device 16 on the platform 3 will still receive data on the position of the ship 1, in particular a vertical reference. Accordingly, it will still be able to transmit real time data about the vertical position of the ship 1, to the control mechanism 17 on the platform 3 via the wireless connection 21, and accordingly the person 12 may still be moved up and down in synchronicity with the ship 1. Even though, some security margin is preferably built into the system this security margin is much smaller than what is necessary in the prior art.

The motion reference unit 18 may comprise any suitably kind of sensor such as accelerometers, gyroscopes, or detectors allowing the position of the ship to be determined, but may include an absolute external reference 19 such as data from GNSS or differential GNSS. It may also rely on accelerometers tracking the motion of the ship 1.

As mentioned above, the offshore structure 2 is a ladderless structure. The lack of a ladder on the offshore structure 2 and the desire to hoist persons 12 and other objects onto the platform 3 using a hoisting mechanism 6 following therefrom, however, involves additional problems. One in particular is the need for a power supply for the hoisting mechanism 6 including the control mechanism 17 and the range sensing device 14.

If there is a power cut, e.g. failure of the grid connection 22 of a wind turbine generator, the wind turbine generator would in a worst case scenario be left powerless and isolated. Should this happen during transfer, it would leave the person 12 being transferred hanging helplessly in midair, as there is no possibility of climbing either up or down. An emergency power supply is therefore provided. Preferably, the hoisting system comprises an emergency power supply such as an uninterruptible power supply (UPS) 23, adapted to supply the hoisting system 6, the range sensing device 14, control unit 16 and the control mechanism 17 for a suitable period of time, allowing the person 12 to be hoisted safely onto the platform 3 of the offshore structure 2 or lowered to the deck 15 of the ship 1.

However, even though the use of a UPS 23 may suffice for acute emergency situations, it may not be suitable for all emergencies. If the power failure has happened long before the ship 1 has arrived with persons 12 that need to be transferred, the UPS is of no use. Accordingly, another back-up power supply is provided. This back-up power supply is provided as an electrical cable 24 that may be attached to an external power source, such as a generator 25, by means of a suitable connector 26.

Preferably, the electrical cable 24 is wound on a retractable cable reel 27 for automatic retraction of the electrical cable 24 and connector 26 towards the platform 3. At or in the vicinity of the free end of the electrical cable 24 where the connector 26 is located, the cable is attached to a tag line 29, which is in turn attached to the offshore structure 2 close to the sea surface 5. Thus the tag line will be in reach from the deck 15 of a properly docked ship 1, by a person 30, e.g. by means of a boat hook 31. Having grabbed the tag line 29, the electrical cable can be pulled down and connected to the generator 25 on the ship 1. The generator 25 is preferably separate from the electrical system of the ship 1, because the system voltages used on wind turbine generators normally differ from the system voltages used on ships.

Having connected the hoisting mechanism 6 to the generator 25 the persons 12 to be transferred, may now be transferred, preferably, but not necessarily using the motion synchronizing system described above using range sensors 14 and/or the motion reference unit 18. This then allows persons 12 to enter the offshore structure 2 after power failure, and e.g. reestablish the normal functioning of the wind turbine generator.

With this, an improved transfer system for transferring objects (such as persons) safely from a ship 1 onto an offshore structure, such as a wind turbine generator. The skilled person will know that the system may be devised in many variants different from the exemplary embodiments explained above without departing from the scope of the claims and the gist of the invention.

The invention claimed is:

1. A system for transferring an object from a ship to an offshore structure, the system comprising:

an electrically operated hoisting mechanism arranged on the offshore structure and adapted to move a hoisting cable, wherein the hoisting cable is attached to the hoisting mechanism, and the hoisting cable comprises an attachment means adapted for attachment to the object;

at least one range sensing device adapted to provide data relating to a detected distance from a reference point on the offshore structure to the ship, where the system is adapted to receive the data from the at least one range sensing device and to move the hoisting cable in response to the detected distance; and a motion reference unit adapted to provide data relating to a detected motion of the ship independently of the at least one range sensing device, wherein the system is adapted to move the hoisting cable in response to the detected motion of the ship, and wherein the offshore structure comprises an electrical emergency power supply cable attachable to an external power source.

2. The system of claim 1, wherein the motion reference unit comprises at least one accelerometer on the ship.

3. The system of claim 1, wherein the motion reference unit comprises a receiver for external positioning data.

4. The system of claim 1, further comprising an emergency power supply for the electrically operated hoisting mechanism.

5. The system of claim 4, wherein the emergency power supply comprises an uninterruptable power supply.

6. The system of claim 5, wherein the external power source is a generator on the ship.

7. The system of claim 6, wherein the generator is independent of the electrical system of the ship.

8. The system of claim 1, wherein the hoisting mechanism comprises a crane arm.

9. A method for transferring an object between a ship and an offshore structure, the method comprising:

providing the offshore structure with an electrically operated hoisting mechanism responsive to a control unit, the control unit configured to receive vertical displacement information from a first device mounted on the offshore structure and receive vertical displacement information from a second device mounted on the ship, and the control unit receiving power from a stand-alone power supply mounted on the offshore structure or a cable adapted to connect to a power source on the ship, wherein the offshore structure comprises an electrical emergency power supply cable attachable to an external power source;

configuring the control unit to, in the absence of vertical displacement information from the first device, continue to operate using the vertical displacement information from the second device; and suspending the object using the hoist, wherein the control unit uses the vertical displacement information to determine to move the object in synchronicity with a vertical position of the ship relative to the offshore structure when within a predetermined distance to a deck of the ship to avoid collision of the object with the ship.

10. The method of claim 9, wherein the offshore structure has no ladder.

11. The method of claim 9, wherein the offshore structure has no power, and the power source on the ship is generator is independent of the electrical system of the ship.

12. The method of claim 9, wherein the second device provides external positioning data.

13. The method of claim 12, wherein the first device is a laser range finder.

14. An offshore structure, comprising:

an electrically operated hoisting mechanism responsive to a control unit, wherein an object is suspended from the hoisting mechanism and the control unit moves the object up or down;

the control unit comprising:

a receiver configured to receive vertical displacement information relative to a ship docked against the offshore structure, the vertical displacement information provided by a first device mounted on the offshore structure and by a second device mounted on the ship;

a motor configured to receive power from a power supply mounted on the offshore structure or a cable adapted to connect to a power source on the ship; and wherein the control unit is configured to move the object in synchronicity with a vertical position of the ship when within a predetermined distance to a deck of the ship to avoid collision of the object with the ship, wherein, in the absence of vertical displacement information from the first device, the control unit is configured to continue to operate the hoisting mechanism using the vertical displacement information from the second device;

wherein the offshore structure has no ladder, and wherein the offshore structure comprises an electrical emergency power supply cable attachable to an external power source.

15. The offshore structure of claim 14, wherein the offshore structure is a wind turbine generator.

16. The offshore structure of claim 14, wherein the offshore structure has no power.

17. The offshore structure of claim 16, wherein the cable is connected to a generator on the ship, and wherein the generator is independent of the electrical system of the ship.

18. The offshore structure of claim 14, wherein the second device provides external positioning data.

19. The offshore structure of claim 18, wherein the first device provides laser ranges.

* * * * *